(No Model.)   J. HOWLAND.   3 Sheets—Sheet 1.
SEED PLANTER.
No. 451,761.   Patented May 5, 1891.
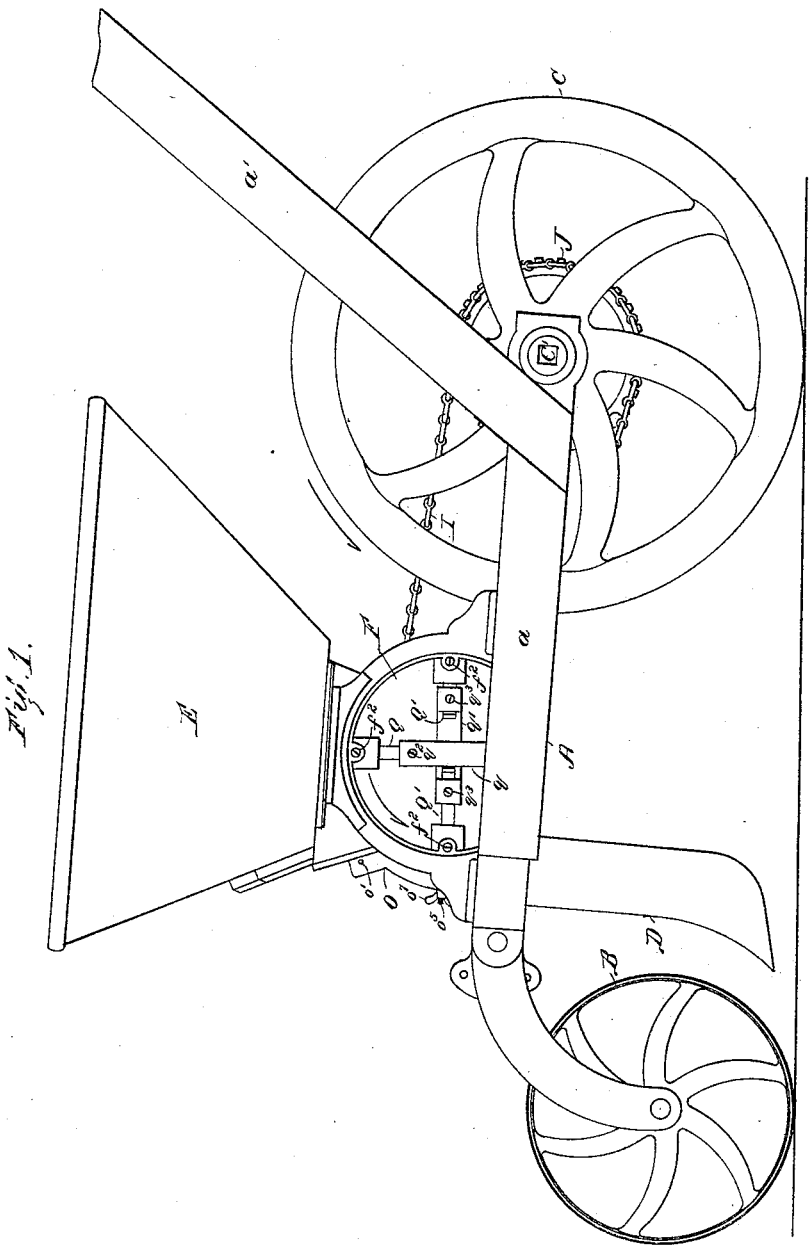
Witnesses
Kirkley Hyde
Gertrude M. Day.
Inventor
John Howland,
By Albert M. Moore,
His Attorney (No Model.)
J. HOWLAND.
SEED PLANTER.
No. 451,761.
3 Sheets—Sheet 2.
Patented May 5, 1891.
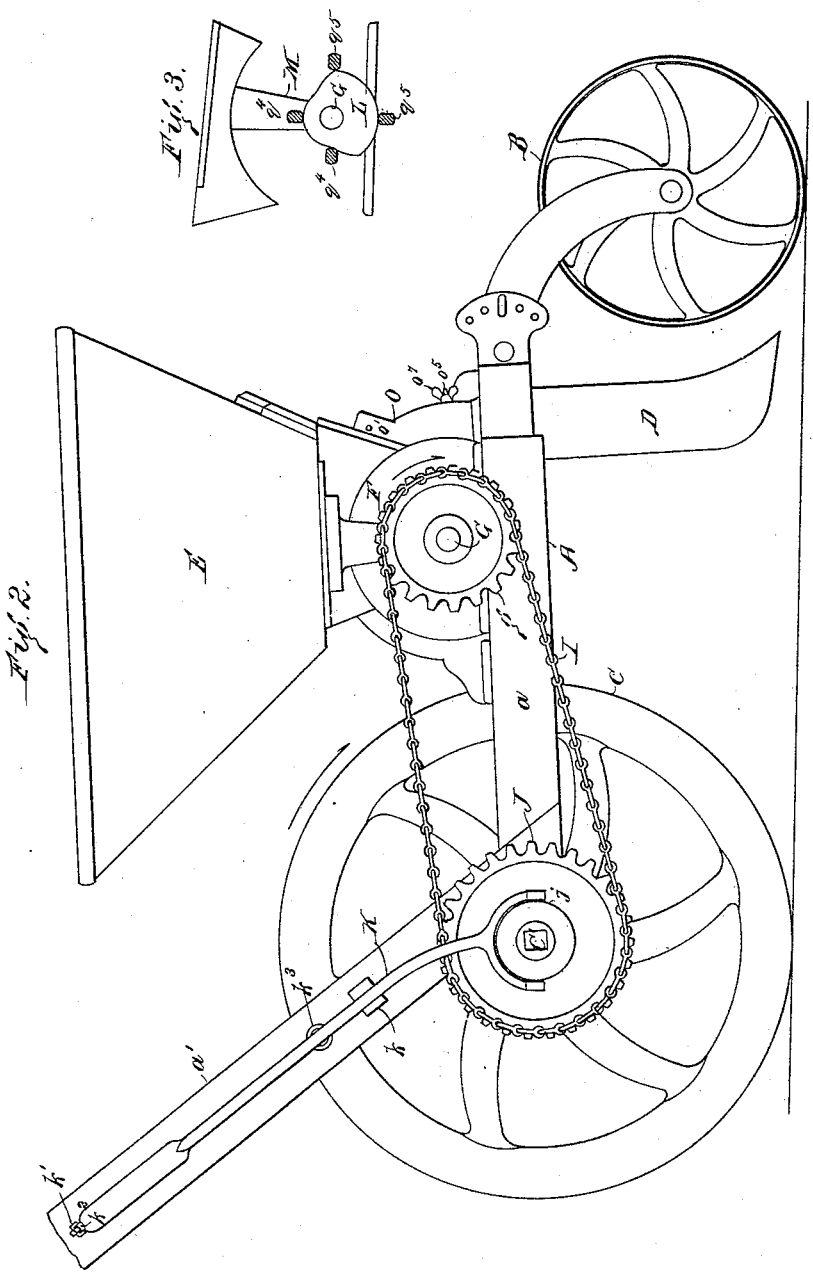
Witnesses
Kirkley Hyde.
Gertrude M. Day.
Inventor
John Howland,
By Albert M. Moore,
His Attorney.

(No Model.) 3 Sheets—Sheet 3.
J. HOWLAND.
SEED PLANTER.
No. 451,761. Patented May 5, 1891.
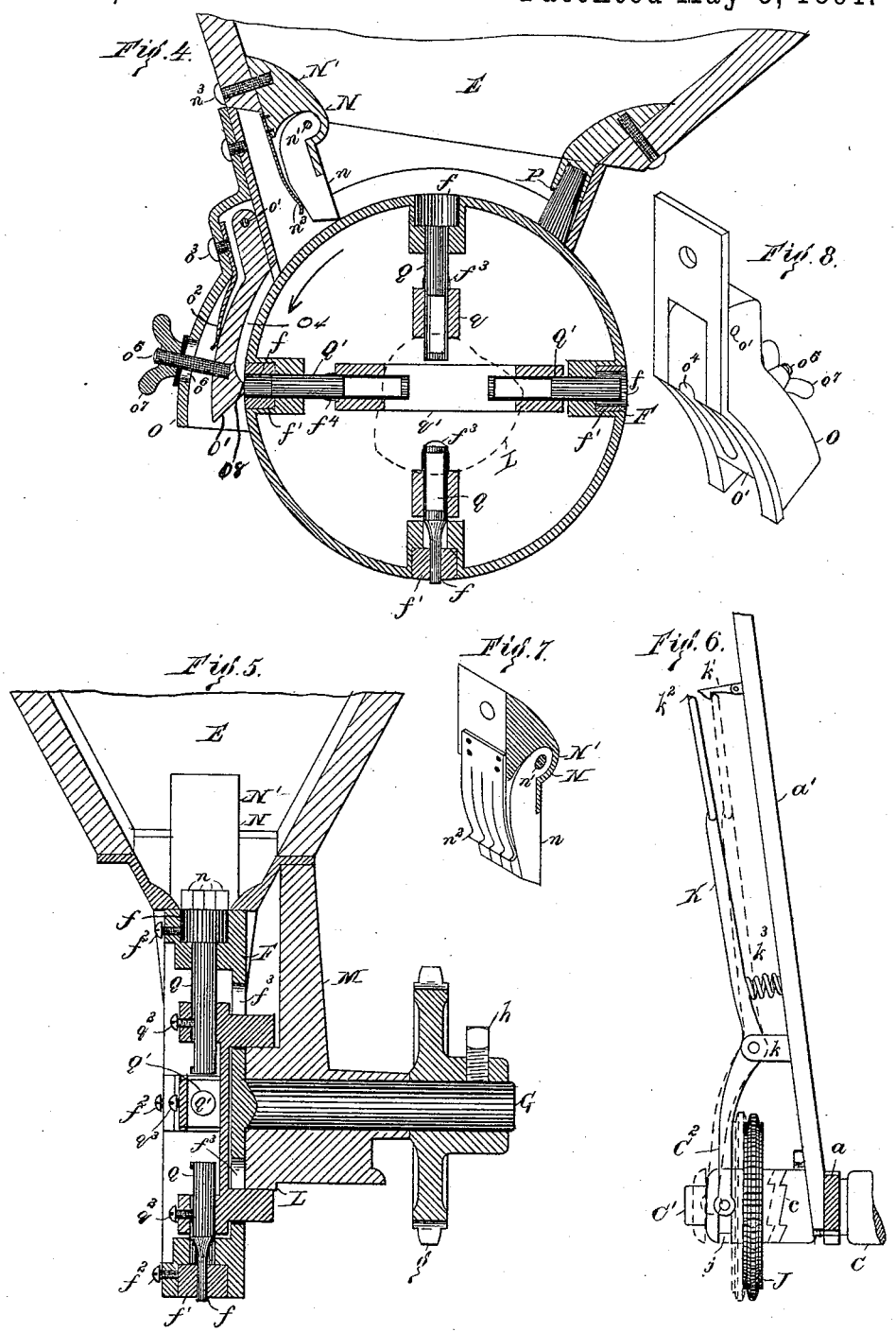

UNITED STATES PATENT OFFICE.

JOHN HOWLAND, OF LOWELL, MASSACHUSETTS.

SEED-PLANTER.

SPECIFICATION forming part of Letters Patent No. 451,761, dated May 5, 1891.

Application filed November 19, 1887. Serial No. 255,564. (No model.)

*To all whom it may concern:*

Be it known that I, JOHN HOWLAND, a citizen of the United States, residing at Lowell, in the county of Middlesex and Commonwealth of Massachusetts, have invented a certain new and useful Improvement in Seed-Planters, of which the following is a specification.

My invention relates to seed-planters, and has for its object to secure the positive dropping of a certain quantity of seed at regular intervals or at will in continuous rows or drills; to enable the machine to be moved upon its supporting-wheels without planting; to enable the machine to be readily adapted to the planting of seeds or grains of different sizes, and to vary the quantities planted at each operation of the machine.

In the accompanying drawings, on three sheets, Figures 1 and 2, respectively, are left-side and right-side elevations of a seed-planter provided with my improvement, the upper ends of the handles being broken away; Fig. 3, a left side elevation of the piston-operating cam and the stand which supports it, showing also, in vertical section, the pins which project from the piston-holders and are moved by the cam; Fig. 4, a central vertical longitudinal section of a part of the seed-box or hopper, the seed-wheel, and the valve and valve-holder, showing also the cam, (in dotted lines,) the piston, the brush, and the strike or cut-off in side elevation; Fig. 5, a central vertical cross-section through the seed-wheel, seed-box, and cam, showing the spindle of the seed-wheel, the strike or cut-off, and two pistons in rear elevation, and the sprocket-wheel in vertical section on said spindle; Fig. 6, a front elevation of a part of one of the handles, a cross-section of one of the side rails, a front elevation of the hub of the covering-wheel and its shaft, and the driving sprocket-wheel secured on said shaft, and the clutch and clutch-operating lever and spring, said clutch being shown in full lines closed and in dotted lines open; Fig. 7, an isometric view of the sectional clearer, its springs, and holder; Fig. 8, an isometric view of the seed-valve and valve-holder and adjusting thumb-nut.

The side rails $a$ and handles $a'$, together forming the frame A, the gage-wheel B, covering-wheel C, and the share D, provided with a seed-tube, are or may be all of the usual construction. Below the seed-box or hopper E is arranged the seed-wheel F on a transverse horizontal spindle G, said wheel having its upper surface at the open lower end of the hopper and its front surface over and partly within the seed-tube of the share. The spindle G is provided with a sprocket-wheel $g$, Figs. 2 and 5, secured thereon by a set-screw $h$ or other equivalent means, and is connected by a chain I to another sprocket-wheel J, which turns loosely on the shaft C' of the covering-wheel C, the hub of said last-named sprocket-wheel being provided with an annular groove $j$, to engage the forked lower end of a lever K, pivoted on a bracket $k$, secured to one of the handles, (the right handle, as shown in Fig. 6,) the upper end of said lever being adapted to be engaged by a hook or latch $k'$, pivoted to the side of said handle, and beveled at $k^2$ on the under side at the free end of said hook, to enable the upper end of the lever, when drawn toward said handle, to raise said hook in order that the hook may drop down over it and prevent it from moving outward from the handle. The upper arm of said lever is normally pressed outward by a spring $k^3$, compressed between said upper arm and the handle of the machine. The adjacent ends of the hubs of the sprocket-wheel J and covering-wheel C are provided with teeth $c$, which when the lever K is in the position shown by full lines in Fig. 6, so engage each other that a forward movement of the machine upon its gage-wheel and covering-wheel will cause the seed-wheel to be rotated. When, therefore, the machine is being moved from place to place, the lever K is in the position shown by dotted lines in Fig. 6, and the parts of the clutch $C^2$, formed by the hubs of the sprocket-wheel J and covering-wheel C, are disengaged and the seed-wheel is not rotated. The teeth of the clutch are so inclined or beveled that when the machine is drawn backward the parts of the clutch-slip on each other and the machine does not plant.

The seed-wheel F is provided in its periphery with cylindrical pockets or radial cavities $f$, which are filled as they pass through the open lower end of the seed-box E, and are emptied into the seed-tube of the share D as the seed-wheel is turned. The capacity of the seed-pockets $f$ may be diminished by reducing bushings $f'$, inserted in said pockets and retained in place by set-screws $f^2$ or other suitable well-known means.

Instead of relying upon gravity to empty the seed-pockets, the seed is positively expelled from the pockets by means of the pistons Q Q' and cam L. The pistons Q Q' are arranged in oppositely-extending radial pairs, the pistons of each pair being connected to each other by piston-holders $q\ q'$ and retained in said holders by set-screws $q^2\ q^3$, by loosening which the pistons may be moved radially to vary the depths of the pockets, or may quickly be removed from the holders and others substituted for them, in order that the pistons may fit the seed-pockets or the central openings of the reducing-bushings $f$ above mentioned. The piston-holders $q\ q'$ are provided with laterally-projecting pins $q^4\ q^5$, which reach through openings $f^3\ f^4$ in the closed or right end of the seed-wheel F, as shown in Fig. 5, each holder being provided with two pins $q^4\ q^5$, and the distance between one pair of such pins being equal to the distance between the other pair of said pins.

The stationary cam L is secured to a bracket M, which supports the seed-box or hopper E, said bracket being supported upon the frame A of the machine. Every diameter of the cam L is equal to every other diameter of the same, and is also equal to the distance between the pins of either pair $q^4\ q^5$. As the seed-wheel is revolved in the direction shown by its arrow in the operation of the planter, the pistons are retracted into the seed-wheel just before the seed-pockets enter the hopper and the other piston of the same pair of pistons is pushed outward to its greatest extent to empty the opposite pocket at the same time.

It is evident that by loosening the set-screws $q^2\ q^3$ the pistons may be made to project into the pockets for a greater or less distance, so that the capacity of the pockets may be varied both in depth and diameter. It is also evident that any one or more of the pistons may be caused by adjustment in the piston-holder to fill entirely the pocket when within the seed-box, and thus to vary the distance between the hills planted—that is, if there are four pistons, causing every other one to fill its pockets when within the seed-box will cause the hills planted to be twice as far apart, and if three of these pistons be thus adjusted to fill their pockets the hills will be four times as far apart as when all the pistons are adjusted to allow all the pockets to fill.

The piston-holders are offset, as shown in Fig. 5, to allow them to slide freely by each other, notwithstanding that the axes of the pistons are all in the same vertical plane. In order that the machine may plant just a pocketful of seed at a time, the strike or cut-off N is used, the same consisting of a series of fingers $n$, arranged on a transverse pivot-rod $n'$, said pivot-rod $n'$ being parallel with the axis of the seed-wheel F, and said fingers $n$ being held by springs $n^2$ in contact with the face of the seed-wheel, the rear faces of said fingers making an angle not greater than a right angle with the feeding surface or face of said seed-wheel, as shown in Fig. 4. As the seed-wheel revolves, the strike or cut-off in passing over the top of any pocket levels off the contents of the pocket and holds back the body of the seed within the seed-box in the usual manner, except that if a single seed or more should be caught between the rear side of the pocket and the strike a sufficient number of the fingers $n$ would yield and allow such seed or seeds to pass the strike, whereas if the strike consisted of a single broad finger extending across the face of the seed-wheel the strike would be lifted in such a manner as to allow many seeds to escape from the hopper between the seed-wheel and the strike. The strike N and its fingers and springs are preferably secured to a removable holder N', which is fastened by screws $n^3$ to the inner front side of the lower part of the seed-box E. To the outside of the front of said seed-box, by one or more screws $o$, is secured the valve-holder or case O, the rear faces and edges of which are in contact with and fit said seed-box and the seed-wheel, said valve-holder extending slightly lower than the center of said seed-wheel. The valve-holder is open in the rear or next the seed-wheel and contains a valve O', which swings on a transverse pivot-pin $o'$, passing through said valve-holder, and is normally held against the face of the seed-wheel by a weak leaf-spring $o^2$, the upper end of which is secured to the valve-holder by a screw $o^3$, and the lower end of which presses against the front face of said valve, the rear face of the valve being shaped and curved, as shown in Figs. 4 and 8, to fit said seed-box and seed-wheel. The middle of the curved rear face of the valve is provided with a groove $o^4$, which reaches from the upper end of said curved face nearly to the lower end of the same.

The lower front end of the seed-box is provided with a discharge-aperture $e$ as wide as one of the pockets, through which aperture any seeds that may be shaken out of the pocket after passing the cut-off or which may jump from the pocket when released from the pressure of the cut-off, may be discharged into the groove $o^4$. The lower end of the groove $o^4$ is inclined downward and backward at $o^8$, Fig. 4, so that any seed in the groove $o^4$ will be carried along by friction with the seeds in the seed-pocket and discharged from said groove as said pocket passes the lower end of the valve O'. The valve O' is provided with a screw $o^5$, which extends forward through a slot $o^6$ in the front of the valve-holder O and engages a thumb-nut $o^7$, which, being turned up against said valve-holder, draws and holds the valve out of contact with the seed-wheel and allows the machine to plant in drills, the seed-wheel being at such times (by a change of the sprocket-wheel) caused to revolve so as to give a continuous discharge of seed.

The office of the brush P is to clear the dirt and dust from the seed-wheel and keep its surface clean and smooth.

A number of such seed-planters may be arranged side by side and connected by a square shaft or equivalent means passing through all the covering-wheels.

I claim as my invention—

1. The combination of the seed-box, the seed-wheel provided with pockets and rotating below and partly within said seed-box, pistons arranged within said seed-wheel and reaching into said pockets, piston-holders in which said pistons are adjustably secured and in which said pistons may be moved radially to vary the depths of said pockets, and a stationary cam arranged to engage said piston-holders and to draw said pistons into said pockets to allow said pockets to be filled while said pockets are in the seed-box, and subsequently to push said pistons outward to empty said pockets below said seed-box as and for the purpose specified.

2. In a seed-planter, the combination of the supporting-wheels, the seed-box, the seed-wheel arranged below and partly within said seed-box and provided with pockets and rotated from one of said supporting-wheels, pistons arranged within said seed-wheel and extending into said pockets, piston-holders to which said pistons are removably secured, a stationary cam arranged to engage said piston-holders and to draw said pistons into said pockets to allow the same to be filled while said pockets are in the seed-box and subsequently to push said pistons outward to empty said pockets below said seed-box, and reducing-bushings adapted to be inserted in said pockets and to diminish the capacity of the same, as and for the purpose specified.

3. The combination of the seed-box, the seed-wheel provided with seed-pockets in its feeding-surface and rotating below and partly within said seed-box, and a divided cut-off consisting of a series of parallel yielding spring-fingers arranged within said seed-box, the free ends of said fingers pressing against said feeding-surface, the rear faces of said fingers making a right angle or less with said feeding-surface, and each finger adapted to be moved forward independently of the others away from said feeding-surface by a seed projecting from any pocket and caught between the rear side of said pocket and such finger to allow said seed to pass said cut-off without permitting the escape of other seeds from said seed-box, as and for the purpose specified.

4. The combination of the seed-wheel provided with seed-pockets, and the valve having a curved surface to fit said seed-wheel and normally held in contact with said wheel and provided in said curved surface with a groove reaching from the upper end of said curved surface nearly to the bottom of the same and having its lower end inclined downward toward said wheel and adapted to catch the seed dropping from said pockets and to be emptied by the friction of the seed in said pockets on the seed in said groove, carrying said last-named seed down through the inclined lower end of said groove and crowding said valve away from said seed-wheel, as and for the purpose specified.

5. The combination of the seed-wheel provided with seed-pockets, and the valve having a curved surface to fit said wheel and normally held in contact with said wheel and provided in said curved surface with a groove reaching downward from the upper end of said curved surface, the lower end of said groove being inclined downward toward said wheel, said groove being adapted to catch the seed dropping from said pockets and to retain the same until the friction of the seed in said pockets carries the seed in said groove out of the lower end thereof, said valve being adapted to be drawn and held out of contact with said wheel to allow said wheel to plant in continuous rows or drills, substantially as specified.

In witness whereof I have, this 11th day of November, A. D. 1887, signed this specification in the presence of two attesting witnesses.

JOHN HOWLAND.

Witnesses:
 ALBERT M. MOORE,
 GEORGE LEACH.